United States Patent [19]

Zuk

[11] 4,301,193

[45] Nov. 17, 1981

[54] PROCESS FOR RESTORATION OF CLEAR PLASTIC

[76] Inventor: Paul W. Zuk, 318 Schaffer Ave., Syracuse, N.Y. 13206

[21] Appl. No.: 168,162

[22] Filed: Jul. 14, 1980

[51] Int. Cl.[3] .......................... G02B 1/10; B05D 3/12; B05D 7/02

[52] U.S. Cl. .................................. 427/140; 427/163; 427/164

[58] Field of Search ..................... 427/140, 163, 164

[56] References Cited

U.S. PATENT DOCUMENTS 3,485,662  12/1969  Metevia .............................. 427/140

Primary Examiner—James R. Hoffman

[57] ABSTRACT

A process for removing scratches and dirt from plastic sheeting, windows, face shields, windshields and other plastic articles that will improve the transparency, optical quality and appearance of the above. More specifically, the process will restore plastic glass replacements that have become so scratched as to have their transparency and optical quality impaired to a state where the transparency, optical quality, and appearance are close to if not equal to, a new article. The process imparts other desirable qualities to the processed article that will become more evident in the attached specification and claims. The process is portable so that the aforementioned improvements in the plastic article may be effected in place; in other words, it is not necessary to remove the article from the vehicle or building to process it.

5 Claims, No Drawings

PROCESS FOR RESTORATION OF CLEAR PLASTIC

FIELD OF INVENTION

This invention relates to a process involving chemical and mechanical techniques to remove scratches from and restore transparency, optical quality, and desirable appearance to plastic sheeting, windows, face shields, windshields, and other articles.

OBJECTS OF THE INVENTION

The prime object of this invention is to provide a chemical process for removal of scratches from and restoration of transparency to plastic sheeting such as (but not limited to) plastic windows, windshields, and facemasks. Further objects and advantages of my invention will become apparent from a consideration of the ensuing description thereof.

DESCRIPTION

This process involves application of two chemical formulations and a polishing technique.

Formulation 1 is a combination of a mild abrasive in a vehicle that is non-volatile. Combinations of from 10 to 50% kaolinite with a mean particle size of from 0.7 to 1.0 microns in from 50 to 90% diethylene glycol is known to be effective, but it is understood that other combinations and types of non-volatile vehicle and mild abrasive may be equally effective and the invention is not limited by the exact quantities in Formulation 1. Formulation 1 may also have surfactants, detergents, and/or water added to it.

Formulation 2 is a water emulsion or solvent solution of silicone fluid. A combination of 100 centistoke dimethyl silicone and 1000 centistoke dimethyl silicone fluid emulsified in water is known to be effective, but it is understood that other combinations and viscosities of silicone fluid in water or solvent may be equally effective and that the invention is not limited by the exact quantities in Formulation 2. Formulation 2 may also have surfactants, detergents, and/or anti-static agents added to it.

The process will require a polishing device for Formulation 1 to accomplish its purpose. A portable polishing device, such as an auto polisher or buffer with wool polishing pad is known to be effective, but it is understood that the invention is not limited by the mechanics of the polishing device or by the specific polishing pad material, as other mechanical devices with polishing action and other polishing pad materials may be equally effective.

BACKGROUND AND OPERATION

In recent years clear plastic such as acrylic and polycarbonate has found increasing use as a glass replacement in building and vehicle windows, in face shields, and in boat windshields. While plastic offers advantages over glass, the plastic materials are easily scratched. A prime example is the scratching of vehicle windows by the brushes used in washing them and by various airborne materials hitting the vehicle. Eventually, the scratches become so numerous and so much dirt becomes embedded in the scratches that vision through the window is obstructed; in many cases the window becomes translucent instead of transparent and must be replaced, as clear and safe vision through it is impossible. Of course, the above statements may be applied to other articles that become scratched to the point that vision through them is impaired, such as face shields and boat windshields. It is the object of this invention to remove the scratches and embedded dirt from the plastic sheet, window, or other article and to render it transparent again so that safe vision through it is again possible and it need not be replaced.

A further object of this invention is to remove scratches and dirt from a plastic sheet, window, or other article even where the article has not yet become so scratched as to become translucent, thereby improving the appearance and optical quality of the above.

Step 1 of the process consists of application of Formulation 1 to the scratched surface of the plastic. This can be easily accomplished with a paint brush or roller, or similar coating device.

Step 2 of the process consists of a rubbing, buffing, or polishing action of Formulation 1 on the plastic with the previously described polishing device. The polishing device is moved over the surface of the scratched plastic until the scratches and dirt are removed therefrom. An article such as a window that had become translucent from scratching will become transparent again.

Once the plastic has been thus treated the residual polish and dirt are washed off to prepare the plastic for Step 3.

Step 3 consists of application of Formulation 2 by spraying or wiping onto the polished surface of the plastic and wiping dry by a very soft cloth or paper towel. This step has a multiple function. Formulation 2 will clean any remaining residue from Formulation 1 off the surface of the plastic. Secondly, Formulation 2 will leave behind a silicone layer on the surface of the plastic. The polished and clarified plastic still may contain microscopic imperfections that can cause light scattering from the plastic surface. The silicone will fill in these microscopic imperfections, minimize the light scattering, and increase the transparency. For example, a window after Step 3 shows clearer, sharper images through it than a window whose processing was stopped before Step 3. The third function of Formulation 2 is to provide a film that will, through the lubricity of the silicone, resist re-scratching and re-soiling. If Formulation 2 also contains an anti-static agent, the plastic treated with it will resist airborne dust that would have been attracted to it by static electricity. Formulation 2 may, of course, also be applied to the unpolished surface, thus imparting the same desirable qualities. Should the silicone from Formulation 2 be worn off the surface through frequent abrasion, it may, of course, be re-applied at a later date well after the initial processing so that it may continue to contribute the aforementioned desirable qualities. A plastic sheet, window, face shield, windshield or other article thus processed will have clarity, optical quality, and appearance close to, if not equivalent to, a new article, thus eliminating the need for replacement.

While the above description contains many specifications, these should not be construed as limitations on the scope of the invention but rather as an exemplification of one preferred embodiment thereof. Many other variations are possible, for example use of different abrasives and non-evaporating vehicles in Formulation 1, and use of solvent based silicone formulations, or other types of silicone fluid in Formulation 2. Yet another variation could be an incorporation of silicone into the polish, Formulation 1. While a highly desirable feature of this process is that it is totally portable and the processing may be carried out without removing the window or other article from the vehicle or building, this does not mean that it could not also be carried out in a central location.

What is claimed is:

1. A process for removing scratches and impregnated dirt from transparent plastic articles for improving the transparency and optical quality thereof, the process including the steps of applying a polishing formulation containing a mild abrasive to a surface to be treated, polishing the surface with a soft material to substantially remove all scratches and dirt from said surface, applying to the polished surface a liquid silicone formulation, and wiping the surface dry with a dry soft material to remove residual dirt and polish and leave behind a thin layer of silicone upon the polished surface which fills the microscopic imperfections in the surface caused by polishing.

2. The process of claim 1 that includes the further step of adding an anti-static agent to the silicone formulation.

3. The process of claim 1 that includes the further step of adding a surfactant to the silicone formulation.

4. The process of claim 1 that includes the further step of adding a detergent to the silicone formulation.

5. The process of claim 1 wherein said silicone formulation contains a combination of 100 centistokes dimethyl silicone fluid and 1000 centistokes dimethyl silicone fluid emulsified in water.

* * * * *